(12) United States Patent
Mosaki

(10) Patent No.: US 11,498,990 B2
(45) Date of Patent: Nov. 15, 2022

(54) CROSSLINKABLE RUBBER COMPOSITION AND CROSSLINKED RUBBER

(71) Applicant: ZEON CORPORATION, Tokyo (JP)

(72) Inventor: Shiho Mosaki, Tokyo (JP)

(73) Assignee: ZEON CORPORATION, Tokyo (JP)

(*) Notice: Subject to any disclaimer, the term of this patent is extended or adjusted under 35 U.S.C. 154(b) by 447 days.

(21) Appl. No.: 16/494,706

(22) PCT Filed: Mar. 2, 2018

(86) PCT No.: PCT/JP2018/008087
§ 371 (c)(1),
(2) Date: Sep. 16, 2019

(87) PCT Pub. No.: WO2018/180207
PCT Pub. Date: Oct. 4, 2018

(65) Prior Publication Data
US 2020/0010597 A1 Jan. 9, 2020

(30) Foreign Application Priority Data
Mar. 30, 2017 (JP) .............................. JP2017-067048

(51) Int. Cl.
*C08F 236/12* (2006.01)
*C08F 220/18* (2006.01)
*C08K 5/17* (2006.01)
*C08L 33/18* (2006.01)
*C08L 79/02* (2006.01)

(52) U.S. Cl.
CPC ...... *C08F 220/1804* (2020.02); *C08F 236/12* (2013.01); *C08K 5/17* (2013.01); *C08L 33/18* (2013.01); *C08F 220/1802* (2020.02); *C08L 79/02* (2013.01); *C08L 2312/00* (2013.01)

(58) Field of Classification Search
CPC .. C08F 236/06; C08F 2810/20; C08F 236/12; C08F 220/18; C08F 2800/02; C08C 19/00; C08C 3/02; C08C 1/15; C08L 79/02; C08L 33/18; C08L 2312/00; C08K 5/17
See application file for complete search history.

(56) References Cited

U.S. PATENT DOCUMENTS

| | | |
|---|---|---|
| 6,657,014 B1 | 12/2003 | Mori et al. |
| 2010/0168302 A1 | 7/2010 | Nagamori et al. |
| 2013/0280459 A1 | 10/2013 | Nakashima et al. |
| 2015/0175784 A1 | 6/2015 | Aoyagi et al. |
| 2017/0015797 A1 | 1/2017 | Katada et al. |
| 2017/0253729 A1* | 9/2017 | Nakashima ............. C08L 15/00 |
| 2018/0134831 A1 | 5/2018 | Shiono |

FOREIGN PATENT DOCUMENTS

| | | |
|---|---|---|
| CN | 106029768 A | 10/2016 |
| EP | 3 124 533 A1 | 2/2017 |
| JP | 2001-055471 A | 2/2001 |
| JP | 2008-163074 A | 7/2008 |
| JP | 2008-222891 A | 9/2008 |
| JP | 2008-291205 A | 12/2008 |
| JP | 2012-057111 A | 3/2012 |
| JP | 2012-135976 A | 7/2012 |
| JP | 2013-091807 A | 5/2013 |
| JP | 2013-142147 A | 7/2013 |
| JP | 2013-203945 A | 10/2013 |
| JP | 2015-017150 A | 1/2015 |
| JP | 2016-183779 A | 10/2016 |
| WO | 2009/011263 A1 | 1/2009 |
| WO | 2012/090941 A1 | 7/2012 |
| WO | 2013/175878 A1 | 11/2013 |
| WO | 2016/190213 A1 | 12/2016 |

OTHER PUBLICATIONS

Aug. 17, 2021 Office Action issued in Japanese Patent Application No. 2019-509061.
Dec. 14, 2020 Extended Search Report issued in European Patent Application No. 18775187.0.
May 29, 2018 Search Report issued in International Patent Application No. PCT/JP2018/008087.
Nov. 18, 2021 Office Action issued in Chinese Patent Application No. 20188018329.7.
Apr. 14, 2022 Office Action issued in European Patent Application No. 18775187.0.
Mar. 9, 2021 Office Action issued in Chinese Patent Application No. 201880018329.7.

* cited by examiner

Primary Examiner — Robert D Harlan
(74) Attorney, Agent, or Firm — Oliff PLC

(57) ABSTRACT

A crosslinkable rubber composition includes a carboxyl group-containing nitrile rubber (A); a carboxyl group-containing acrylic rubber (B); and a polyamine-based crosslinking agent (C), where a ratio of a weight of the carboxyl group-containing nitrile rubber (A) to a weight of the carboxyl group-containing acrylic rubber (B) is from 5:95 to 95:5. The carboxyl group-containing nitrile rubber (A) includes 5 to 60% by weight of α,β-ethylenically unsaturated nitrile monomer units, and α,β-ethylenically unsaturated monocarboxylic acid ester monomer units. The carboxyl group-containing nitrile rubber (A) has an iodine value of 120 or less.

7 Claims, No Drawings

CROSSLINKABLE RUBBER COMPOSITION AND CROSSLINKED RUBBER

BACKGROUND OF THE INVENTION

1. Field of the Invention

The disclosures discussed herein relate to crosslinkable rubber compositions and crosslinked rubber.

2. Description of the Related Art

Nitrile rubber is known to have superior mechanical properties, oil resistance, heat resistance, and the like, and has been used in a wide range of applications including seals, belts, hoses, and the like. Furthermore, nitrile rubber containing a carboxyl group with a relatively low iodine value is known to provide crosslinked rubber with excellent normal physical properties, compression set resistance, and cold resistance (e.g., Patent Document 1).

RELATED-ART DOCUMENT

Patent Document

[Patent Document 1] Japanese Unexamined Patent Application Publication No. 2008-163074

SUMMARY OF THE INVENTION

Technical Problem

To crosslink crosslinkable rubber compositions to produce products, flash remaining on edges of products is often torn off to be removed in a finishing process after a molding process. In such a finishing process of removing flash, it is desirable that no flash remains on each product, and that no parts of the products are removed together with flash.

Thus, it is desirable that crosslinkable rubber compositions are capable of providing crosslinked rubber not only with excellent normal physical properties and cold resistance, but also with excellent flash removability in a finishing process of products of crosslinked rubber.

In light of the above, an object of the present invention is to provide a crosslinkable rubber composition capable of providing a crosslinked rubber with excellent cold resistance and excellent manageability in a finishing process of products of the crosslinked rubber.

Solution to Problem

In order to solve the above-described problem, one aspect of the present invention is to provide a crosslinkable rubber composition that includes a carboxyl group-containing nitrile rubber (A);
a carboxyl group-containing acrylic rubber (B); and
a polyamine-based crosslinking agent (C),
wherein a ratio of a weight of the carboxyl group-containing nitrile rubber (A) to a weight of the carboxyl group-containing acrylic rubber (B) is from 5:95 to 95:5,
wherein the carboxyl group-containing nitrile rubber (A) includes
    5 to 60% by weight of α,β-ethylenically unsaturated nitrile monomer units, and
    α,β-ethylenically unsaturated monocarboxylic acid ester monomer units, and wherein the carboxyl group-containing nitrile rubber (A) has an iodine value of 120 or less.

Advantageous Effects of Invention

According to one aspect of the present invention, a crosslinkable rubber composition is capable of producing a crosslinked rubber with excellent cold resistance and excellent manageability in a finishing process of products of the crosslinked rubber.

DETAILED DESCRIPTION OF THE PREFERRED EMBODIMENTS

<Crosslinkable Rubber Composition>

A crosslinkable rubber composition according to the present embodiment includes a carboxyl group-containing nitrile rubber (A); a carboxyl group-containing acrylic rubber (B); and a polyamine-based crosslinking agent (C), where a ratio of a weight of the carboxyl group-containing nitrile rubber (A) to a weight of the carboxyl group-containing acrylic rubber (B) is from 5:95 to 95:5. The carboxyl group-containing nitrile rubber (A) includes 5 to 60% by weight of α,β-ethylenically unsaturated nitrile monomer units, and α,β-ethylenically unsaturated monocarboxylic acid ester monomer units. The carboxyl group-containing nitrile rubber (A) has an iodine value of 120 or less.

The above-described configuration provides a crosslinkable rubber composition having properties capable of producing a crosslinked rubber with excellent cold resistance and with excellent manageability in the finishing process of products of the crosslinked rubber. Note that the excellent manageability in a finishing process in this case indicates that after crosslinking of and molding of the crosslinkable rubber composition, flash remaining on edges of a product of the resulting crosslinked rubber is easily and appropriately removed, and chipping of the product is prevented in a process of removing the flash. Such properties of crosslinked rubber exhibiting excellent manageability in a finishing process are also referred to herein as "finishing process manageability".

In the present invention, the finishing process manageability is associated with tear strength, and an embodiment having the above configuration may provide a crosslinked rubber with optimal tear strength that may improve finishing process manageability.

<Carboxyl Group-Containing Nitrile Rubber (A)>

A carboxyl group-containing nitrile rubber (A) (hereinafter simply called "nitride rubber (A)") for use in the present embodiment includes 5 to 60% by weight of α,β-ethylenically unsaturated nitrile monomer units and α,β-ethylenically unsaturated monocarboxylic acid ester monomer units, where the carboxyl group-containing nitrile rubber (A) has an iodine value of 120 or less.

Nitrile rubber (A) is produced by copolymerizing α,β-ethylenically unsaturated nitrile monomers, α,β-ethylenically unsaturated monocarboxylic acid ester monomers, and other copolymerizable monomers that may be optionally added.

Examples of the α,β-ethylenically unsaturated nitrile monomers forming α,β-ethylenically unsaturated nitrile monomer units in nitrile rubber (A) include, but are not particularly limited to, α,β-ethylenically unsaturated compounds having nitrile groups. Examples of such α,β-ethylenically unsaturated compounds having nitrile groups include acrylonitrile; α-halogeno acrylonitrile such as α-chloroacrylonitrile and α-bromoacrylonitrile; α-alkyl acrylonitrile such as methacrylonitrile; and the like. Of these, acrylonitrile and methacrylonitrile are preferable, and acrylonitrile is more preferable. The α,β-ethylenically unsaturated nitrile monomers may be used alone or in combination of two or more.

The content of the α,β-ethylenically unsaturated nitrile monomer units is preferably 3 to 60% by weight, more preferably 5 to 60% by weight, still more preferably 5 to 40% by weight, further more preferably 8 to 40% by weight, still further preferably 8 to 30% by weight, and still further more preferably 10 to 30% by weight, with respect to a total amount of monomer units forming the nitrile rubber (A). By setting the content of the α,β-ethylenically unsaturated nitrile monomer units within the range described above, the resulting crosslinked rubbers have excellent kinetic properties and increased rebound resilience. Further, the content of the α,β-ethylenically unsaturated nitrile monomer units being 5% by weight or more may improve oil resistance of the crosslinked rubber, and the content of the α,β-ethylenically unsaturated nitrile monomer units being 60% by weight or less may improve the cold resistance.

Examples of α,β-ethylenically unsaturated monocarboxylic acid ester monomers that form α,β-ethylenically unsaturated monocarboxylic acid ester monomer units in nitrile rubber (A), include: methyl acrylate, ethyl acrylate, n-butyl acrylate, isobutyl acrylate, n-dodecyl acrylate, methyl methacrylate, ethyl methacrylate, and other (meth)acrylic acid alkyl esters having alkyl groups with 1 to 18 carbon atoms; methoxymethyl (meth)acrylate, 2-methoxyethyl (meth)acrylate, ethoxyethyl (meth)acrylate, 2-ethoxyethyl (meth)acrylate, 2-(n-propoxy)ethyl (meth)acrylate, 2-isopropoxyethyl (meth)acrylate, 2-(n-butoxy)ethyl (meth)acrylate, 2-isobutoxyethyl (meth)acrylate, 2-(t-butoxy)ethyl (meth)acrylate, 3-methoxypropyl (meth)acrylate, 4-methoxybutyl (meth)acrylate, and other (meth)acrylic acid alkoxyalkyl esters having alkoxyalkyl groups with 2 to 12 carbon atoms; α-cyanoethyl acrylate, α-cyanoethyl methacrylate, α-cyanobutyl methacrylate, and other (meth)acrylic acid esters having cyanoalkyl groups with 2 to 12 carbon atoms; 2-hydroxyethyl acrylate, 2-hydroxypropyl acrylate, 2-hydroxyethyl methacrylate, and other (meth)acrylic acid esters having hydroxyalkyl groups with 1 to 12 carbon atoms; and trifluoroethyl acrylate, tetrafluoropropyl methacrylate, and other (meth)acrylic acid esters having fluoroalkyl groups with 1 to 12 carbon atoms.

Of these, (meth)acrylic acid alkyl esters having alkyl groups with 1 to 18 carbon atoms, and (meth)acrylic acid alkoxyalkyl esters having alkoxyalkyl groups with 2 to 12 carbon atoms are preferable; (meth)acrylic acid alkyl esters having alkyl groups with 1 to 10 carbon atoms, and (meth)acrylic acid alkoxyalkyl esters having alkoxyalkyl groups with 2 to 8 carbon atoms are more preferable; n-butyl (meth)acrylate, and 2-methoxyethyl(meth)acrylate are still more preferable; and n-butyl acrylate is particularly preferable, from the viewpoint of improving cold resistance. The α,β-ethylenically unsaturated nitrile monomers may be used alone or in combination of two or more.

In the present specification, "(meth)acrylic acid" refers to methacrylic acid and/or acrylic acid.

The content of α,β-ethylenically unsaturated monocarboxylic acid ester monomer units in nitrile rubber (A) is preferably 5 to 60% by weight, more preferably 10 to 55% by weight, and furthermore preferably 15 to 45% by weight. Compression set resistance and cold resistance of crosslinked rubber may be improved by setting the content of α,β-ethylenically unsaturated monocarboxylic acid ester monomer units to 5% or more by weight, and oil resistance and kinetic characteristics may be improved by setting the content to 60% by weight or less.

The nitrile rubber (A) may contain carboxyl group-containing monomer units. The carboxyl group-containing monomers forming the carboxyl group-containing monomer units include, but are not particularly limited to, monomers having one or more unsubstituted (free) carboxyl groups that are not esterified, and that are capable of being copolymerized with the above-described α,β-ethylenically unsaturated nitrile monomer units and α,β-ethylenically unsaturated monocarboxylic acid ester monomer units. Since the nitrile rubber (A) contains carboxyl group-containing monomer units, the resulting crosslinked rubber has excellent compression set resistance.

Examples of carboxyl group-containing monomers include α,β-ethylenically unsaturated monocarboxylic acid monomers, α,β-ethylenically unsaturated polycarboxylic acid monomers, and α,β-ethylenically unsaturated dicarboxylic acid monomers. Examples of carboxyl group-containing monomers also include monomers in which carboxyl groups of these monomers form carboxylate salts. In addition, α,β-ethylenically unsaturated polycarboxylic acid anhydrides may also be used as carboxyl group-containing monomers because they cleave the acid anhydride groups after copolymerization to form carboxyl groups.

Preferable examples of the α,β-ethylenically unsaturated monocarboxylic acid monomers have 3 to 12 carbon atoms, such as acrylic acid, methacrylic acid, ethyl acrylic acid, crotonic acid, silicic acid, and the like.

Preferable examples of the α,β-ethylenically unsaturated polycarboxylic acid monomers have 4 to 12 carbon atoms, such as fumaric acid, maleic acid, and other butenedioic acids; itaconic acid, citraconic acid, mesaconic acid, glutaconic acid, allylmalonic acid, teraconic acid, and the like. In addition, examples of α,β-unsaturated polycarboxylic acid anhydrides include maleic anhydride, itaconic anhydride, citraconic anhydride, and the like.

As an organic group bonded to a carbonyl group through an oxygen atom forming part of an ester bond in the α,β-ethylenically unsaturated dicarboxylic acid monoester monomer, an alkyl group, a cycloalkyl group, or an alkyl cycloalkyl group is preferable. Of these, an alkyl group is particularly preferable as an organic group. In a case where the organic group bonded to the carbonyl group is an alkyl group, the number of carbon atoms in the alkyl group is preferably 1 to 10, more preferably 2 to 6, and particularly preferably 4 to 5. In a case where the organic group bonded to the carbonyl group is a cycloalkyl group, the number of carbon atoms in the cycloalkyl group is preferably 5 to 12, and more preferably 6 to 10. In a case where the organic group bonded to the carbonyl group is an alkyl cycloalkyl group, the number of carbon atoms in the alkyl cycloalkyl group is preferably 6 to 12, and more preferably 7 to 10. By setting the number of carbon atoms of the organic group within the above range, the processing stability of the crosslinkable rubber composition may be obtained, an appropriate crosslinking rate may be obtained, and mechanical properties of the resulting crosslinked rubber product may also be improved.

Examples of α,β-ethylenically unsaturated dicarboxylic acid monoester monomers forming α,β-ethylenically unsaturated dicarboxylic acid monoester monomer units include: monomethyl maleate, monoethyl maleate, monopropyl maleate, mono-n-butyl maleate, and other maleic acid monoalkyl esters; monocyclopentyl maleate, monocyclohexyl maleate, monocycloheptyl maleate, and other maleic acid monocycloalkyl esters; monomethylcyclopentyl maleate, monoethylcyclohexyl maleate, and other maleic acid monoalkylcycloalkyl esters; monomethyl fumarate, monoethyl fumarate, monopropyl fumarate, mono-n-butyl fumarate, and other fumaric acid monoalkyl esters; monocyclohexyl fumarate, monocycloheptyl fumarate, and other fumaric acid monocycloalkyl esters; monomethylcyclopentyl fumarate, monoethylcyclohexyl fumarate, and other fumaric acid monoalkylcycloalkyl esters; monomethyl citraconate, monoethyl citraconate, monopropyl citraconate, mono-n-butyl citraconate, and other citraconic acid monoalkyl esters; monocyclopentyl citraconate, monocyclohexyl citraconate, monocycloheptyl citraconate, and other citraconic acid monocycloalkyl esters; monomethylcyclopentyl citraconate, monoethylcyclohexyl citraconate, and other citraconic acid monoalkylcycloalkyl esters; monomethyl itaconate, monoethyl itaconate, monopropyl itaconate, mono-n-butyl itaconate, and other itaconic acid monoalkyl esters; monocyclopentyl itaconate, monocyclohexyl itaconate, monocycloheptyl itaconate, and other itaconic acid monocycloalkyl esters; and monomethylcyclopentyl itaconate, monoethylcyclohexyl itaconate, and itaconic acid monoalkylcycloalkyl esters.

Of these, the α,β-ethylenically unsaturated dicarboxylic acid monoester monomer having carboxyl groups for each of two carbon atoms which form an α,β-ethylenically unsaturated bond are preferable. Examples of such α,β-ethylenically unsaturated dicarboxylic acid monoester monomer include monopropyl maleate, mono-n-butyl maleate, monopropyl fumarate, mono-n-butyl fumarate, monopropyl citrate, monopropyl citraconate, mono-n-butyl citraconate, and the like. In addition, an α,β-ethylenically unsaturated dicarboxylic acid monoester monomer having two carboxyl groups in the cis position (in the cis configuration) such as mono-n-butyl maleate or monopropyl citraconate is more preferable, and mono-n-butyl maleate is particularly preferable.

The carboxyl group-containing monomers described above may be used alone or may be used in combination of two or more.

The content of the carboxyl group-containing monomer units in the nitrile rubber (A) is preferably 0.1 to 20% by weight, more preferably 0.2 to 15% by weight, and still more preferably 0.5 to 10% by weight. By setting the content of the carboxyl group-containing monomer units to 0.1% or more by weight, the compression set resistance of the resulting crosslinked rubber may be improved. By setting the content to 20% or less by weight, the scorch stability of the rubber composition and the fatigue resistance of the crosslinked rubber may be improved.

The nitrile rubber (A) preferably contains conjugated diene monomer units in addition to the α,β-unsaturated nitrile monomer units and α,β-ethylenically unsaturated monocarboxylic acid monomer units. Preferable examples of the conjugated diene monomers forming conjugated diene monomers include conjugated diene monomers having 4 to 6 carbon atoms, such as 1,3-butadiene, isoprene, 2,3-dimethyl-1,3-butadiene, 1,3-pentadiene, chloroprene, and the like. Of these, 1,3-butadiene and isoprene are more preferable, and 1,3-butadiene is further preferred. The conjugated diene monomers may be used alone or may be used in combination of two or more.

The content of the conjugated diene monomer units in the nitrile rubber (A) is preferably 20 to 89.9% by weight, more preferably 25 to 75% by weight, and furthermore preferably 30 to 60% by weight. By setting the content of the conjugated diene monomer units to 20% or more, the rubber elasticity of the resulting crosslinked rubber may be improved, and by setting the content to 89.9% or less, the heat resistance and chemical stability may be maintained.

The nitrile rubber (A) may further include other monomer units which may be copolymerized with the α,β-ethylenically unsaturated nitrile monomer units and α,β-ethylenically unsaturated monocarboxylic acid ester monomer units as described above; or other monomer units which may be copolymerized with the α,β-ethylenically unsaturated nitrile monomer units, α,β-ethylenically unsaturated monocarboxylic acid ester monomer units, carboxyl group containing monomers, and conjugated diene monomers as described above. Examples of such other monomers include ethylene, α-olefin monomers, aromatic vinyl monomers, α,β-ethylenically unsaturated dicarboxylic acid dialkyl ester monomers, fluorine-containing vinyl monomers, copolymerizable antiaging agents, and the like.

Preferable examples of the α-olefin monomers include α-olefin monomers with carbon atoms of 3 or more and 12 or less, such as propylene, 1-butene, 4-methyl-1-pentene, 1-hexene, 1-octene, and the like.

Examples of aromatic vinyl monomers include styrene, α-methylstyrene, vinyl pyridine, and the like.

Examples of α,β-ethylenically unsaturated dicarboxylic acid dialkyl ester monomers include dimethyl maleate, dimethyl fumarate, dimethyl itaconate, diethyl itaconate, and the like.

Examples of fluorine-containing vinyl monomers include fluoroethylvinyl ether, fluoropropylvinyl ether, o-trifluoromethylstyrene, vinyl pentafluorobenzoate, difluoroethylene, tetrafluoroethylene, and the like.

Examples of copolymerizable antiaging agents include N-(4-anilinophenyl)acrylamide, N-(4-anilinophenyl)methacrylamide, N-(4-anilinophenyl)cinnamimide, N-(4-anilinophenyl)crotonamide, N-phenyl-4-(3-vinylbenzyloxy)aniline, N-phenyl-4-(4-vinylbenzyloxy)aniline, and the like.

These other copolymerizable monomers may be used in combination of two or more. The content of other monomer units is preferably 50% by weight or less, more preferably 30% by weight or less, still more preferably 10% by weight or less, and particularly preferably 3% by weight or less, with respect to the total monomer units forming nitrile rubber (A).

The content of carboxyl groups in nitrile rubber (A), that is, the molar number of carboxyl groups per 100 g of nitrile rubber (A), is preferably $5\times10^{-4}$ to $5\times10^{-1}$ ephr, more preferably $1\times10^{-3}$ to $1\times10^{-1}$ ephr, and further more preferably $5\times10^{-3}$ to $8\times10^{-2}$ ephr. By setting the carboxyl group content of the nitrile rubber (A) within the above range, crosslinking of the crosslinkable rubber composition may be sufficiently promoted to obtain appropriate tensile strength of the resulting crosslinked rubber, as well as obtaining good fatigue resistance of the crosslinked rubber.

The iodine value of the nitrile rubber (A) is 120 or less, preferably 80 or less, more preferably 25 or less, and particularly preferably 15 or less. The use of nitrile rubber (sometimes referred to as a highly saturated nitrile rubber) having an iodine value of 120 or less may improve the heat resistance and ozone resistance of the resulting cured adhesive layer.

The polymer Mooney viscosity (ML1+4, 100° C.) of the nitrile rubber (A) is preferably 15 to 200, more preferably 15 to 150, and particularly preferably 15 to 100. By setting the Mooney viscosity of the nitrile rubber (A) within the above range, strength properties of the crosslinked rubber may be well maintained, and processability of the crosslinkable rubber composition may be improved.

Methods of producing nitrile rubber (A) are not particularly specified. For example, the nitrile rubber (A) may be produced by copolymerizing α,β-ethylenically unsaturated nitrile monomers, carboxy group-containing monomers such as the α,β-ethylenically unsaturated dicarboxylic acid monomers, α,β-ethylenically unsaturated monocarboxylic acid monomers, and conjugated diene monomers as needed, in addition to other copolymerizable monomers. As a polymerization process, any of the known emulsion polymerization, suspension polymerization, bulk polymerization, and solution polymerization processes may be used. However, the emulsion polymerization process is preferable because the polymerization reaction is easily controlled.

In a case where the iodine value of the copolymers obtained by copolymerization is higher than 120, the copolymers may be hydrogenated (hydrogenated). Methods of hydrogenation are not particularly specified, and hydrogenation may be carried out by known methods.

<Carboxyl Group-Containing Acrylic Rubber (B)>

The carboxyl group-containing acrylic rubber (B) (hereinafter simply referred to as "acrylic rubber (B)") used in the present embodiment may preferably contain (meth)acrylic acid ester monomer units as principal components. As used herein, a principal component refers to a monomer component that accounts for 50% or more of the total monomer units of acrylic rubber (B).

The acrylic rubber (B) may be a polymer, which contains 50 to 100% by weight of (meth)acrylic acid ester monomer units, and 0 to 10% by weight of crosslinkable monomer units including carboxyl group-containing monomer units, as principal components in molecules.

Examples of (meth)acrylic acid monomers forming (meth)acrylic acid ester monomers suitable for main components of acrylic rubber (B) include, but are not particularly limited to, (meth)acrylic acid alkyl ester monomers, (meth)acrylic acid alkoxyalkyl ester monomers, and the like.

Examples of the (meth)acrylic acid alkyl ester monomers include, but are not particularly limited to, esters of an alkanol having 1 to 8 carbon atoms and (meth)acrylic acid. Specific examples include methyl (meth) acrylate, ethyl (meth) acrylate, n-propyl (meth)acrylate, n-butyl (meth) acrylate, isopropyl (meth)acrylate, isobutyl (meth)acrylate, n-hexyl (meth)acrylate, 2-ethylhexyl (meth)acrylate, cyclohexyl (meth)acrylate, and the like. Of these, ethyl (meth) acrylate and n-butyl (meth)acrylate are preferable. In view of improving cold resistance, n-butyl acrylate is preferable. In view of improving the balance between oil resistance and cold resistance, it is further preferable that ethyl acrylate and n-butyl acrylate be used in combination.

Although examples of the (meth)acrylic acid alkoxyalkyl ester monomers are not particularly limited, esters of alkoxyalkyl alcohols having 2 to 8 carbon atoms and (meth)acrylic acid are preferable. Specific examples include methoxymethyl (meth)acrylate, ethoxymethyl (meth)acrylate, 2-methoxyethyl (meth)acrylate, 2-ethoxyethyl (meth)acrylate, 2-propoxyethyl (meth)acrylate, 2-butoxyethyl (meth)acrylate, 3-methoxypropyl (meth)acrylate, 4-methoxybutyl (meth)acrylate, and the like. Of these, 2-ethoxyethyl (meth)acrylate and 2-methoxyethyl (meth)acrylate are preferable, and 2-ethoxyethyl acrylate and 2-methoxyethyl acrylate are particularly preferable.

The (meth)acrylic acid monomer units described above may be used alone or may be used in combination of two or more. For example, it is preferable to use ethyl acrylate, n-butyl acrylate, and 2-methoxyethyl acrylate in combination.

The content of (meth)acrylic acid ester monomer units in acrylic rubber (B) is preferably 30 to 99.9% by weight, more preferably 40 to 99.5% by weight, still more preferably 50 to 99.5%, and particularly preferably 70 to 99% by weight. By setting the content of the (meth)acrylic acid ester monomer units within the above range, weather resistance, heat resistance, and oil resistance of the resulting crosslinked rubber may be improved.

In the case of acrylic rubber (B), it is preferable that the content of the (meth)acrylic acid alkyl ester monomer units be 30 to 100% by weight, and the content of the (meth)acrylic acid alkoxyalkyl ester monomer units be 0 to 70% by weight, with respect to a total content of the (meth)acrylic acid ester monomer units.

The acrylic rubber (B) may contain carboxyl group-containing monomer units as crosslinkable monomers that form crosslinkable monomer units. Examples of carboxyl group-containing monomers forming the carboxyl group-containing monomer units include, but are not particularly limited to, α,β-ethylenically unsaturated monocarboxylic acid monomers having 3 to 12 carbon atoms, α,β-ethylenically unsaturated dicarboxylic acid monomers having 4 to 12 carbon atoms, and monoester monomers of α,β-ethylenically unsaturated dicarboxylic acids having 4 to 12 carbon atoms and alkanols having 1 to 8 carbon atoms.

Specific examples of α,β-ethylenically unsaturated monocarboxylic acid monomers having 3 to 12 carbon atoms include acrylic acid, methacrylic acid, α-ethylacrylic acid, crotonic acid, silicic acid, and the like. Specific examples of α,β-ethylenically unsaturated dicarboxylic acid monomers having 4 to 12 carbon atoms include butenedioic acid such as fumaric acid and maleic acid; itaconic acid; citraconic acid; chloromaleic acid; and the like.

Specific examples of monoester monomers of α,β-ethylenically unsaturated dicarboxylic acids having 4 to 12 carbon atoms and alkanols having 1 to 8 carbon atoms include: monomethyl fumarate, monoethyl fumarate, mono-n-butyl fumarate, monomethyl maleate, monoethyl maleate, mono-n-butyl maleate, and other butenedioic acid mono-chain alkyl esters; monocyclopentyl fumarate, monocyclohexyl fumarate, monocyclohexenyl fumarate, monocyclopentyl maleate, monocyclohexyl maleate, and monocyclohexenyl maleate, and other butenedioic acid monoesters having alicyclic structures; and monomethyl itaconate, monoethyl itaconate, mono-n-butyl itaconate, monocyclohexyl itaconate, and other itaconic acid monoesters.

Of these, butenedioic acid mono-chain alkyl esters or butenedioic acid monoesters having alicyclic structures are preferable; mono-n-butyl fumarate, mono-n-butyl maleate, monocyclohexyl fumarate, and monocyclohexyl maleate are more preferable; and mono-n-butyl fumarate is particularly preferable. These α,β-ethylenically unsaturated carboxylic acid monomers may be used alone or in combination with two or more. Of the monomers described above, dicarboxylic acids include those that are present as anhydrides.

The content of the carboxyl group-containing monomer units is preferably 0.1 to 10% by weight, more preferably 0.5 to 7% by weight, and still more preferably 1 to 5% by weight. By setting the content of the carboxyl group-containing monomer units within the above range, sufficient crosslinking may be obtained, and a shape of the resulting crosslinked rubber may be well maintained. Further, by setting the content of the carboxyl group-containing monomer units within the above range, stretchability and compression set resistance of the resulting crosslinked rubber may also be improved.

The content of the carboxyl groups in the acrylic rubber (B), that is, the molar number (ephr) of the carboxyl groups per 100 g of acrylic rubber (B), is preferably $4\times10^{-4}$ to $4\times10^{-1}$ (ephr), more preferably $1\times10^{-3}$ to $2\times10^{-1}$ (ephr), and still more preferably $5\times10^{-3}$ to $1\times10^{-1}$ (ephr). By setting the content of carboxyl groups within the above range, the crosslinking may be sufficiently promoted to improve mechanical properties of the resulting crosslinked rubber, as well as increasing stretchability and compression set resistance of the crosslinked rubber.

Acrylic rubber (B) may include crosslinkable monomers other than carboxyl group-containing monomer units, such as monomer units having epoxy groups, monomer units having halogen atoms, diene monomer units, and the like, within a range not to interfere with the effects of the present invention.

Examples of monomers having epoxy groups include, but are not particularly limited to, epoxy group-containing (meth)acrylates, epoxy group-containing ethers, and the like. Specific examples include glycidyl (meth)acrylate, allyl glycidyl ether, vinyl glycidyl ether, and the like.

Examples of monomers having halogen atoms include unsaturated alcohol esters of halogen-containing saturated carboxylic acids, (meth)acrylic acid haloalkyl esters, (meth)acrylic acid haloacyloxy alkyl esters, (meth)acrylic acid (haloacetylcarbamoyloxy) alkyl esters, halogen-containing unsaturated ethers, halogen-containing unsaturated ketones, halomethyl group-containing aromatic vinyl compounds, halogen-containing unsaturated amides, haloacetyl group-containing unsaturated monomers, and the like.

Examples of the diene monomers include 1,3-butadiene, isoprene, piperylene, and other conjugated diene monomers; and ethylidene norbornene, dicyclopentadiene, dicyclopentadienyl (meth) acrylate, 2-dicyclopentadienylethyl (meth) acrylate, and other non-conjugated diene monomers.

Crosslinkable monomers forming crosslinkable monomer units other than the carboxyl group-containing monomer units described above may be used alone or in combination of two or more. The content of other crosslinkable monomer units in the acrylic rubber (B) is preferably 0 to 9.9% by weight, more preferably 0 to 6.5% by weight, still more preferably 0 to 4.5% by weight, and particularly preferably 0 to 4% by weight.

Moreover, in addition to (meth)acrylic acid ester monomer units and crosslinkable monomer units, the acrylic rubber (B) may optionally include other monomers copolymerizable with (meth)acrylic acid ester monomers and crosslinkable monomers.

Examples of other copolymerizable monomers include, but are not particularly limited to, aromatic vinyl monomers, α,β-ethylenically unsaturated nitrile monomers, monomers having two or more acryloyloxy groups (hereinafter referred to as "polyfunctional acrylic monomers"), olefin-based monomers, and vinyl ether compounds.

Specific examples of aromatic vinyl monomers include styrene, α-methylstyrene, and divinylbenzene, and the like.

Specific examples of α,β-ethylenically unsaturated nitrile monomers include acrylonitrile, methacrylonitrile, and the like.

Specific examples of polyfunctional acrylic monomers include ethylene glycol di(meth)acrylate, propylene glycol di(meth)acrylate, and the like.

Specific examples of olefin-based monomers include ethylene, propylene, 1-butene, 1-octene, and the like.

Specific examples of vinyl ether compounds include vinyl acetate, ethyl vinyl ethers, n-butyl vinyl ethers, and the like.

Of these, styrene, acrylonitrile, methacrylonitrile, ethylene and vinyl acetate are preferable. In view of improving tensile strength and breaking elongation, it is preferable that other copolymerizable monomer units contain ethylene monomer units.

The acrylic rubber (B) may be so-called ethylene-acrylate rubber in a case of other copolymerizable monomer units containing ethylene monomer units.

The above-described other copolymerizable monomer units may be used alone or in combination of two or more. The content of other monomer units in the acrylic rubber (B) is 0 to 70% by weight, preferably 0 to 60% by weight, more preferably 0 to 50% by weight, still more preferably 0 to 40% by weight, and particularly preferably 0 to 30% by weight.

The acrylic rubber (B) used in the present embodiment may be obtained by polymerizing the above-described monomers. As the form of polymerization reaction, any of emulsion polymerization method, suspension polymerization method, bulk polymerization method and solution polymerization method may be used; however, in view of controllability of polymerization reaction and the like, it is preferable to use an emulsion polymerization method under normal pressure, which is commonly used as a method for producing acrylic rubber known in the art. Emulsion polymerization may be any of a batch system, semi-batch system, and continuous system. Polymerization is usually carried out in a temperature range of 0 to 70° C., preferably in a temperature range of 5 to 50° C.

The polymer Mooney viscosity ($ML_{1+4}$, at 100° C.) of the acrylic rubber (B) is preferably 10 to 80, more preferably 20 to 70, and particularly preferably 25 to 60.

In the present embodiment, a combining ratio of the nitrile rubber (A) and the acrylic rubber (B) (weight of the nitrile rubber (A): weight of the acrylic rubber (B)) is preferably from 5:95 to 95:5, more preferably from 10:90 to 90:10, still more preferably from 25:75 to 75:25, further more preferably from 35:65 to 65:35, and even more preferably from 40:60 to 60:40. By setting the combining ratio within the above range, it is possible to obtain crosslinked rubber with excellent cold resistance and optimal tear strength to improve finishing process manageability.

<Polyamine-Based Crosslinking Agent (C)>

The crosslinkable rubber composition according to the present embodiment contains a polyamine-based crosslinking agent (C). The use of a polyamine-based crosslinking agent (C) provides crosslinked rubber having good oil resistance, heat resistance and ozone resistance, low compression set, and excellent cold resistance.

Examples of the polyamine-based crosslinking agent (C) include, but are not particularly limited to, a compound having two or more amino groups, or a compound with such a form having two or more amino groups at the time of crosslinking. Specifically, examples of the polyamine-based crosslinking agent (C) include a compound in which a plurality of hydrogen atoms in an aliphatic hydrocarbon or aromatic hydrocarbon are substituted with amino groups or hydrazide structures (structures represented by —CONHNH2, wherein CO represents a carbonyl group), and a compound which becomes the aforementioned compound at the time of crosslinking.

Specific examples of the polyamine-based crosslinking agent (C) include: hexamethylenediamine, hexamethylenediamine carbamate, N,N-dicinnamylidene-1,6-hexanediamine, tetramethylene pentamine, hexamethylenediamine cinnamaldehyde adduct, and other aliphatic polyvalent amines; 4,4-methylene dianiline, m-phenylenediamine, 4,4-diaminodiphenyl ether, 4,4-diaminodiphenyl ether, 4,4-(m-phenylenediisopropylidene) dianiline, 4,4-(p-phenylenediisopropylidene) dianiline, 2,2-bis[4-(4-aminophenoxy) phenyl]propane, 4,4-diamino-benzanilide, 4,4-bis(4-aminophenoxy) biphenyl, m-xylylenediamine, p-xylylenediamine, 1,3,5-benzenetriamine, and other aromatic polyamines; and isophthalic acid dihydrazide, terephthalic acid dihydrazide, phthalic acid dihydrazide, 2,6-naphthalene dicarboxylic acid dihydrazide, naphthalene acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzenetricarboxylic acid dihydrazide, aconitic acid dihydrazide, pyromellitic acid dihydrazide; and other polyvalent hydrazides. Of these, hexamethylenediamine carbamate is particularly preferable.

The amount of polyamine-based crosslinking agent (C) in the crosslinkable rubber composition according to the present embodiment is preferably 0.1 to 20 parts by weight, more preferably 0.2 to 15 parts by weight, and still more preferably 0.5 to 10 parts by weight, with respect to a total amount of 100 parts by weight of nitrile rubber (A) and of acrylic rubber (B). By setting the amount of the crosslinking agent within the above range, crosslinked rubber with good oil resistance, heat resistance and ozone resistance, low compression set, excellent cold resistance, and fatigue resistance may be obtained.

Note that the crosslinkable rubber composition according to the present embodiment may further include a crosslinking agent other than a polyamine-based crosslinking agent (C), such as a sulfur crosslinking agent and an organic peroxide crosslinking agent, to the extent that the effect of the present invention is not impaired.

<Other Components>

In addition to those components described above, the crosslinkable rubber composition according to the present embodiment may further include a combining agent commonly used in the technical field of rubber, such as reinforcing fillers such as carbon black and silica, non-reinforcing fillers such as calcium carbonate and clay, a crosslinking promotor, a crosslinking retarder, an age resistor, an antioxidant, a light stabilizer, an anti-scorching agent such as a primary amine, a silane coupling agent, a plasticizer, a processing aid (a lubricant), an adhesive, a lubricant, a flame retardant, a mold retardant, an acid acceptor, an antistatic agent, a pigment, and the like. The amount of such a combining agent is not particularly limited to the extent that the amount does not inhibit the purposes or effects of the present invention; a combining agent may be added in an amount suitable for the purposes of the combination.

Since the polyamine-based crosslinking agent (C) is used in the present embodiment, a basic crosslinking promotor may preferably be contained as a crosslinking promotor. Since some crosslinking promoters may also function as crosslinking agents, compounds other than those added as crosslinking agents may be used for crosslinking promoters.

Examples of basic crosslinking promoters include: 1,8-diazabicyclo[5,4,0]undecene-7 (hereinafter, also abbreviated as "DBU"), 1,5-diazabicyclo[4,3,0]nonene-5,1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl) imidazole, 1-methylbenzoimidazole, 1-methyl-2-benzylbenzoimidazole, 1-methyl-5-nitrobenzoimidazole, 1-methylimidazoline, 1,2-dimethylimidazoline, 1,2,4-trimethylimidazoline, 1,4-dimethyl-2-ethylimidazoline, 1-methylphenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, or other basic crosslinking promoters having a cyclic amidine structure; tetramethylguanidine, tetraethylguanidine, diphenylguanidine, 1,3-di-o-tolylguanidine, o-tolylbiguanide, or other guanidine-based basic crosslinking promoters; n-butylaldehyde aniline, acetoaldehyde ammonia, or other aldehyde amine-based basic crosslinking promoters; and dicyclopentylamine, dicyclohexylamine, dicycloheptylamine, or other dicycloalkylamine; and N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, N-octylclooctylamine, N-hydroxymethylcyclopentylamine, N-hydroxybutylcyclohexylamine, N-methoxyethylcyclopentylamine, N-ethoxybutylcyclohexylamine, N-methoxycarbonylbutylcyclopentylamine, N-methoxycarbonylheptylcyclohexylamine, N-aminopropylcyclopentylamine, N-aminoheptylcyclohexylamine, di(2-chlorocyclopentyl)amine, di(3-chlorocyclopentyl) amine, or other secondary amine-based basic crosslinking promoters. Of these, guanidine-based basic crosslinking promoters, secondary amine-based basic crosslinking promoters, and basic crosslinking promoters having a cyclic amidine structure are preferable; 1,8-diazabicyclo[5,4,0]undecene-7 and 1,5-diazabicyclo[4,3,0]nonene-5 are more preferable; and 1,8-diazabicyclo[5,4,0]undecene-7 is particularly preferable.

The basic crosslinking promoters having a cyclic amidine structure may form salts with organic carboxylic acids, alkyl phosphoric acids, or the like. The secondary amine-based basic crosslinking promoters may also be a mixture of alcohols such as alkylene glycols, and alkyl alcohols having 5 to 20 carbon atoms, and may also contain inorganic acids and/or organic acids. The secondary amine-based basic crosslinking promoters may form salts with inorganic and/or organic acids, and further form complexes with alkylene glycols.

The basic crosslinking promoters may be used alone or may be used in combination of two or more. In addition, the amount of basic crosslinking promoters in the crosslinkable rubber composition is preferably 0.1 to 20 parts by weight, more preferably 0.2 to 15 parts by weight, and further more preferably 0.5 to 10 parts by weight, with respect to a total amount of 100 parts by weight of the nitrile rubber (A) and of the acrylic rubber (B). By setting the amount of the crosslinking promoters in the above range, the compression set resistance of the resulting crosslinked rubber may further be improved.

Examples of plasticizers include, but are not particularly limited to, trimellitic acid-based plasticizers, pyromellitic acid-based plasticizers, ether ester-based plasticizers, polyester-based plasticizers, phthalic acid-based plasticizers, adipic ester-based plasticizers, phosphate ester-based plasticizers, sebacic acid ester-based plasticizers, alkylsulfonic ester compound plasticizers, epoxylated vegetable oil-based plasticizers, and the like. Specific examples include tri-2-ethylhexyl trimellitate, trimellitic acid isononyl esters, trimellitic acid mixed linear alkyl esters, dipentaerythritol esters, pyromellitic acid 2-ethylhexyl esters, polyetheresters (molecular weight of approximately 300 to 5000), bis[2-(2-butoxyethoxy)ethyl]adipate, dioctyl adipate, adipic acid-based polyesters (molecular weight of approximately 300 to 5000), dioctyl phthalate, diisononyl phthalate, dibutyl phthalate, tricresyl phosphate, dibutyl sebacate, alkylsulfonic phenyl esters, epoxidized soybean oil, diheptanoate, di-2-ethylhexanoate, didecanoate, didecanoate, and the like.

The plasticizers may be used alone or may be used in combination of two or more. In addition, it is preferable that the amount of plasticizers in the crosslinkable rubber composition is 1 to 10 parts by weight with respect to a total amount of 100 parts by weight of the nitrile rubber (A) and the acrylic rubber (B).

Examples of antiaging agents include, but are not particularly limited to, phenyl-1-naphthylamine, alkylated diphenylamine, octylated diphenylamine, 4,4-bis(α,α-dimethylbenzyl)diphenylamine, p-(p-toluenesulfonylamide)diphenylamine, N,N-di-2-naphthyl-p-phenylenediamine, N,N-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, or other amine-based antiaging agents; 2,2,4-trimethyl-1,2-dihydroguinoline, 6-ethoxy-1,2-dihydro-2,2,4-trimethylquinoline, or other amino ketone-based antiaging agents; 2,6-di-tert-butyl-4-methylphenol, 2,6-di-tert-butyl-4-ethylphenol, 2,2-methylenebis(4-ethyl-6-tert-butylphenol), 2,2-methylenebis(4-methyl-6-tert-butylphenol), 4,4-butylidene(3-methyl-6-tert-butylphenol), 4,4-thiobis(3-methyl-6-tert-butylphenol), 2,5-di-tert-butylhydroquinone, 2,5-di-tert-amylhydroquinone, or other phenolic antiaging agents; and metal salts of 2-mercaptobenzimidazole, 2-mercaptomethylbenzimidazole, and 2-mercaptomethylbenzimidazole, or other benzoimidazole-based antiaging agents. These antiaging agents may be used alone or may be used in combination of two or more. The amount of the antiaging agents in the crosslinkable rubber composition is preferably 0.1 to 10 parts by weight with respect to a total amount of 100 parts by weight of the nitrile rubber (A) and the acrylic rubber (B).

Examples of processing aids (lubricants) include, but are not particularly limited to, higher fatty acids such as stearic acids, lauric acids, and their derivatives such as salts, esters, amides, and the like. In addition, as processing aids, anionic surfactant components may be used. Examples of anionic surfactant components include: polyoxyethylene higher alcohol ethers such as polyoxyethylene lauryl alcohols, polyoxyethylene lauryl ethers, polyoxyethylene oleyl ethers, and the like; polyoxyethylene alkylaryl ethers such as polyoxyethylene octylphenyl ethers, and polyoxyethylene nonylphenyl ethers; polyoxyethylene acyl esters such as polyoxyethylene glycol monostearate; polypropylene glycol ethylene oxide adducts; polyoxyethylene sorbitan aliphatic esters such as polyoxyethylene sorbitan monolaurate, and polyoxyethylene sorbitan monostearate; and phosphate esters such as alkyl phosphate esters and polyoxyethylene alkylether phosphoric acid esters, and the like. Cellulose ethers may also be used. The processing aids may be used alone or may be used in combination of two or more. The amount of the processing aids in the crosslinkable rubber composition is preferably 0.1 to 10 parts by weight with respect to a total amount of 100 parts by weight of the nitrile rubber (A) and of the acrylic rubber (B).

Furthermore, the crosslinkable rubber composition according to the present embodiment may be combined with other rubbers (polymers) other than the nitrile rubber (A) and acrylic rubber (B) described above to the extent that the effects of the present invention are not inhibited. Examples of other rubbers include acrylic rubber, ethylene-acrylic acid copolymer rubber, fluorine rubber, styrene-butadiene copolymer rubber, ethylene-propylene copolymer rubber, ethylene-propylene-diene terpolymer rubber, natural rubber, and polyisoprene rubber. In the case of combining other polymers, the combining amount of other polymers in the crosslinkable rubber composition is preferably 30 parts by weight or less, more preferably 20 parts by weight or less, and still more preferably 10 parts by weight or less, with respect to a total amount of 100 parts by weight of the nitrile rubber (A) and of the acrylic rubber (B).

The crosslinkable rubber composition according to the present embodiment is prepared by mixing the above-described components preferably in a non-aqueous system. The method of preparing the crosslinkable rubber composition according to the present embodiment is not particularly specified; however, the method of preparing the crosslinkable rubber composition according to the present embodiment generally includes initially performing a primary kneading of components excluding a crosslinking agent and a heat-labile crosslinking aid in a mixer, e.g., the Banbury (registered trademark) mixer, an intermixer, a kneader and the like; and subsequently performing secondary kneading of the primarily kneaded components transferred to a roll or the like, by adding a crosslinking agent, a heat-labile crosslinking aid, or the like.

The Mooney viscosity ($ML_{1+4}$, 100° C.) of the crosslinkable rubber composition according to the present embodiment is preferably 10 to 200, more preferably 15 to 150, and still more preferably 20 to 120.

<Crosslinked Rubber>

The crosslinked rubber according to an embodiment of the present invention is made by crosslinking the crosslinkable rubber composition according to the embodiment described above.

The crosslinked rubber according to the present embodiment may be produced by using the crosslinkable rubber composition according to the present embodiment. For example, the crosslinked rubber according to the present embodiment may be produced by forming the crosslinkable rubber composition by using, for example, a molding machine corresponding to a desired shape, such as an extruder, injection molding machine, compressor, roll, and the like; heating the crosslinkable rubber composition to promote a cross-linking reaction; and fixing a shape of the crosslinkable rubber composition as a crosslinked product. In this case, crosslinking may be performed after the preliminary forming of the crosslinkable rubber composition or crosslinking may be performed simultaneously with the forming of the crosslinkable rubber composition. The forming temperature is normally 10 to 200° C., preferably 25 to 120° C. The crosslinking temperature is normally 100 to 200° C., and preferably 130 to 190° C., and the crosslinking time is normally 1 minute to 1 hour, and preferably 2 minutes to 30 minutes.

Further, even if the surface of rubber has been crosslinked, the inside of the crosslinked rubber is not necessarily crosslinked sufficiently, depending on shape, size, etc. of the crosslinked rubber. In such a case, the rubber may be further heated for secondary crosslinking. To promote secondary crosslinking, the rubber may preferably be heated at 130 to 220° C., and more preferably 140 to 200° C., for 1 to 48 hours.

As a heating method, a general method for crosslinking rubber such as press heating, steam heating, oven heating, or air heating may be suitably selected.

The tear strength of the crosslinked rubber is preferably 20 to 30 N/mm, and more preferably 20 to 27 N/mm, in order to improve finishing process manageability. The tear strength of the crosslinked rubber being 20 N/mm or more allows the flash to be removed from the products in the finishing process without leaving the flash on the products, and the tear strength being 30 N/mm or less prevents the products from being damaged by removal of the flash.

<Use of Crosslinked Rubber>

In the present embodiment, by combining a predetermined carboxyl group-containing nitrile rubber (A) and a carboxyl group-containing acrylic rubber (B), and using a polyamine crosslinking agent as a crosslinking agent, it is possible to produce a crosslinked rubber having an optimum tear strength, which improves cold resistance and finishing process manageability. In addition, the crosslinked rubber obtained from the crosslinkable rubber composition according to the present embodiment has excellent normal physical properties such as tensile strength and excellent compression set resistance.

The crosslinked rubber according to the present embodiment may be widely used for seals, belts, hoses, rubber-coated gaskets, rolls, and the like. In particular, the crosslinked rubber according to the present embodiment may preferably be used for O-rings, rubber packings, diaphragms, oil seals, oil coolant seals, shaft seals, bearing seals, wellhead seals, air compressor seals, seals for sealing the chlorofluorocarbons or fluorohydrocarbons or carbon dioxide used for cooling apparatuses of air-conditioners or compressors for cooling machines for air-conditioning systems, seals for sealing supercritical carbon dioxide or sub-critical carbon dioxide used for washing media for precision washing, seals for roller devices (roller bearings, automobile hub units, automobile water pumps, linear guide devices, balls and screws, etc.), valves and valve seats, BOP (Blow-Out Preventers), platters, and other various types of seal materials; and intake manifold gaskets attached at connecting part of intake manifold and cylinder head, cylinder head gaskets attached at connecting part of cylinder block and cylinder head, rocker cover gaskets attached at connecting part of rocker cover and cylinder head, oil pan gaskets attached at connecting part of oil pan and cylinder block or transmission case, fuel cell separator gaskets attached between a pair of housings sandwiching a unit cell provided with an anode, electrolyte plates, and cathode, top cover gaskets of a hard disk drive, and other various types of gaskets.

EXAMPLES

The following illustrates embodiments of the present invention in more detail with reference to examples and comparative examples. In the following, the "parts" and "%" are based on weight unless otherwise specially indicated. The physical properties and properties were tested and evaluated as follows.

<Rubber Composition>

The content of monomer units which form nitrile rubber (A) was measured by the following method. That is, first, with respect to content of mono-n-butyl maleate units, 100 ml 2-butanone was added to 0.2 g of a 2 mm-side square carboxyl group-containing nitrile rubber, and the mixture was then stirred for 16 hours. Subsequently, 20 ml of ethanol and 10 ml of water were added to the mixture, and titration was conducted while stirring using a 0.02 N hydrous ethanol solution of potassium hydroxide at room temperature by thymolphthalein as an indicator, thereby obtaining the number of moles of the carboxyl groups with respect to 100 g of the carboxyl group-containing nitrile rubber. The resulting number of moles was then converted into the amount of mono-n-butyl maleate units. Further, the content of monomer units which form acrylic rubber (B) was determined by 1H-NMR analysis.

The content of 1,3-butadiene units and saturated butadiene units was calculated by measuring the iodine value (in accordance with JIS K 6235) using nitrile rubber before and after a hydrogenation reaction. The content of the acrylonitrile units was calculated by measuring the content of nitrogen in the nitrile rubber by the Kjeldahl method in accordance with JIS K 6383. The content of n-butyl acrylate units or 2-methoxyethyl acrylates was calculated as a remaining component with respect to the above-described monomer units.

<Iodine Value>

The iodine value of nitrile rubber was measured in accordance with JIS K 6235.

<Normal Physical Properties (Tensile Strength, Breaking Elongation)>

The crosslinkable nitrile rubber composition was placed in a mold with height, width, and depth of 15 cm, 15 cm, and 0.2 cm, respectively, and was pressed by application of pressure with a press pressure of 10 MPa while heating at 170° C. for 20 minutes for primary crosslinking. Subsequently, the resulting primary crosslinked product was subject to secondary crosslinking at 170° C. for 4 hours in a gear type oven to obtain a sheet-like crosslinked product. The resulting sheet-like crosslinked rubber was punched by a No. 3 type dumbbell cutter to prepare test specimens. The resulting test specimens were then used to measure the tensile strength and breaking elongation of the crosslinked rubber in accordance with JIS K 6251.

<Tear Strength>

From the sheet-like crosslinked rubber obtained in the same manner as described above, uncut angle-shaped test specimens were prepared. The resulting test specimens were used to measure the tear strength (N/mm) in a cross-grain direction of the crosslinked rubber according to a method using JISK6252-1-based uncut angle test specimens.

<Hardness>

Further, the resulting test specimens were used to measure hardness of the crosslinked rubber obtained in the same manner as described above using a Durometer hardness tester (type A) in accordance with JIS K 6253.

<Cold Resistance Test>

A sheet-like crosslinked rubber obtained in the same manner as described above was used to measure the cold resistance of crosslinked rubber in accordance with JIS K 6261 by TR test (low temperature retraction test). Specifically, elongated test specimens were frozen and the restoration of the test specimens was measured by continuously increasing the temperature, and the temperature TR10 (° C.) was measured upon the lengths of the test specimens being contracted (restored) by 10% due to temperature rise. It was determined that the lower the TR10, the better the resistance to cold.

<Finishing Process Manageability Evaluation>

A nitrile rubber composition with an outer diameter of 30 mm and a thickness of 2.1 mm was crosslinked by pressing at 170° C. for 20 minutes, using an O-ring mold with an outer diameter of 30 mm, an inner diameter of 23.8 mm, and a thickness of 3.1 mm, to obtain an O-ring primary crosslinked product. Subsequently, the resulting primary crosslinked product was heated at 170° C. for 4 hours in a gear type oven to obtain a secondary crosslinked product (test specimen). A 0.5 cm incision was made with scissors along the outer diameter of the O-ring secondary crosslinked product and then flash was removed with a bare hand. Furthermore, flash remaining on the test specimen was cut along the outer diameter of the O-ring secondary crosslinked product using scissors, and the weight of remaining flash (flash remaining amount) was measured. This measurement was performed on 160 test specimens per example.

Evaluations were performed as follows. First, evaluation was conducted for each test specimen as follows: a test specimen with no chipping and a remaining amount of flash being less than 5.5 mg was assessed as a "good specimen", and a test specimen with no chipping but with a remaining amount of flash being 5.5 mg or more, or a test specimen with chipping with any amount of remaining flash was regarded as a "no good specimen". Then, an example was evaluated as "A" when the number of good specimens out of 160 specimens was 140 or more, an example was evaluated as "B" when the number of good specimens was 80 or more and less than 140, and an example was evaluated as "C" when the number of good specimens was less than 80.

Production Example 1: Production of Nitrile Rubber (A1)

In Production Example 1, 220 parts of ion exchanged water, 5 parts of 10 wt % sodium dodecylbenzene sulfonate aqueous solution, 20.4 parts of acrylonitrile, 5 parts of mono-n-butyl maleate, 35.2 parts of n-butyl acrylate, 0.35 parts of t-dodecyl mercaptan (secondary alkyl thiol compound), and 0.03 parts of 2,2,4,6,6-pentamethyl-4-heptanethiol (primary alkyl thiol compound) were sequentially charged in this order in a reactor. The internal gas was then replaced with nitrogen three times, and 39.4 parts of 1,3-butadiene were subsequently charged in the reactor. The reactor was then held at 10° C., 0.1 parts of cumene hydroperoxide (polymerization initiator), a reducing agent, and a suitable amount of chelating agent were charged, and the polymerization reaction continued with stirring. When the polymerization conversion ratio reached 90%, 0.1 parts of a 10 wt % aqueous hydroquinone solution (polymerization terminator) was added to stop the polymerization reaction. The residual monomers were then removed at a water temperature of 60° C. to obtain a latex of nitrile rubber (solid concentration of approximately 30 wt %).

The obtained latex was placed in an autoclave, a palladium catalyst (solution of an acetone solution of 1% by weight of palladium acetate, and ion exchanged water mixed in equal weights) was added such that the content of palladium was to be 2000 ppm with respect to weight of dried rubber contained in the latex, and a hydrogenation reaction was performed at a hydrogen pressure of 3 MPa at a temperature of 50° C. for 6 hours, to obtain a latex of the nitrile rubber (A1).

Then, to the resulting latex of nitrile rubber (A1), methanol in a volume twice as much as the rubber was added to coagulate the latex. The coagulated latex was filtered to yield solids (crumbs), which were subsequently vacuum-dried at 60° C. for 12 hours to obtain the nitrile rubber (A1). The resulting nitrile rubber (A1) had a carboxyl group content of $2.6 \times 10^{-2}$ ephr, and iodine value of 9. The resulting nitrile rubber (A1) also had 20.8 wt % of acrylonitrile units, 44.2 wt % of butadiene units (including saturated units), 4.5 wt % of mono-n-butyl maleate units, and 30.5 wt % of n-butyl acrylate units.

Production Example 2: Production of Nitrile Rubber (A2)

In Production Example 2, a nitrile rubber (A2) was obtained in the same manner as in Production Example 1, except that in the polymerization reaction, the amounts of monomers to be initially charged were changed to 23.0 parts of acrylonitrile, 6.5 parts of mono-n-butyl maleate, and 40.0 parts of 1,3-butadiene; and 30.5 parts of 2-methoxyethyl acrylate were used instead of 35.2 parts of n-butyl acrylate. The resulting nitrile rubber (A2) had a carboxyl group content of $3.4 \times 10^{-2}$ ephr, and iodine value of 9. Further, the resulting nitrile rubber (A2) had 24.0 wt % of acrylonitrile units, 46.6 wt % of butadiene units (including saturated units), 6.5 wt % of mono-n-butyl maleate units, and 22.9 wt % of 2-methoxyethyl acrylate units.

Production Example 3: Production of Nitrile Rubber (A3)

In Production Example 3, a nitrile rubber (A3) was obtained in the same manner as in Production Example 1, except that in the polymerization reaction, the amounts of monomers to be initially charged were changed to 16.0 parts of acrylonitrile, 5.0 parts of mono-n-butyl maleate, 36.0 parts of n-butyl acrylate, and 43.0 parts of 1,3-butadiene. The resulting nitrile rubber (A3) had a carboxyl group content of $2.6 \times 10^{-2}$ ephr, and iodine value of 10. Further, the resulting nitrile rubber (A3) had 15.0 wt % of acrylonitrile units, 45.0 wt % of butadiene units (including saturated units), 5.0 wt % of mono-n-butyl maleate units, and 35.0 wt % of n-butyl acrylate units.

Production Example 4: Production of Nitrile Rubber (A4)

In Production Example 4, a nitrile rubber (A4) was obtained in the same manner as in Production Example 1, except that in the polymerization reaction, the amounts of monomers to be initially charged were changed to 37.0 parts of acrylonitrile, 4.0 parts of mono-n-butyl maleate, and 57.0 parts of 1,3-butadiene; and 35.2 parts of n-butyl acrylate was not combined. The resulting nitrile rubber (A4) had a carboxyl group content of $3.0 \times 10^{-2}$ ephr, and iodine value of 9. Further, the resulting nitrile rubber (A4) had 35.7 wt % of acrylonitrile units, 58.6 wt % of butadiene units (including saturated units), and 5.7 wt % of mono-n-butyl maleate units.

Production Example 5: Production of Acrylic Rubber (B1)

200 parts of water, 3 parts of sodium lauryl sulfate, 47.3 parts of ethyl acrylate, 51.0 parts of n-butyl acrylate, and 1.70 parts of mono-n-butyl fumarate were charged in a polymerization reactor, which was equipped with a thermometer, a stirring device, a nitrogen inlet tube, and a vacuum device. Thereafter, repeated vacuum degassing and nitrogen substitution were conducted to remove sufficient oxygen from the polymerization reactor, and 0.002 parts of sodium formaldehyde sulfoxide and 0.005 parts of cumene hydroperoxide were subsequently added to initiate emulsion polymerization reaction at ambient pressure and temperature, and the reaction was continued until the polymerization conversion ratio reached 95%. The resulting emulsion polymerization solution was coagulated with an aqueous solution of calcium chloride, washed with water, and dried to yield a carboxyl group-containing acrylic rubber (B1). The composition of the resulting carboxyl group-containing acrylic rubber (B1) had 47.3 wt % of ethyl acrylate, 51.0 wt % of n-butyl acrylate, and 1.70 wt % mono-n-butyl fumarate.

Production Example 6: Production of Acrylic Rubber (B2)

In Production Example 6, an acrylic rubber (B2) was obtained in the same manner as in Production Example 5, except that in the polymerization reaction, the amounts of monomers to be initially charged were changed to 4.2 parts of ethyl acrylate, 64.4 parts of n-butyl acrylate, and 1.40 parts of mono-n-butyl fumarate, and 30.0 parts of 2-methoxyethyl acrylate were added. The composition of the resulting carboxyl group-containing acrylic rubber (B1) had 4.2 wt % of ethyl acrylate, 64.4 wt % of n-butyl acrylate, 30.0 parts of 2-methoxyethyl acrylate, and 1.40 wt % of mono-n-butyl fumarate.

Preparation of Acrylic Rubber (B3) to (B5)

The acrylic rubber (B3) to (B5) used were as follows.
Acrylic rubber (B3): "Vamac (registered trademark) Ultra IP", Dupont Co. (ethylene-acrylic acid ester copolymer, containing carboxylic acid as cross-linking points)
Acrylic rubber (B4): "Vamac Ultra LT", Dupont Co. (ethylene-acrylic acid ester copolymer, containing carboxylic acid as cross-linking points)
Acrylic rubber (B5): "ER A804" Denka Co. (ethylene-acrylic ester-vinyl acetate copolymer, containing carboxylic acid as cross-linking points)
The following rubber compositions were prepared using the above-described nitrile rubber (A1) to (A4) and acrylic rubber (B1) to (B5). Note that in Table 1-3, details of the components other than the rubber used in the examples and comparative examples are as follows.
Silica: "Nipsil ER", Tosoh Silica Co., Ltd.
Carbon black: "SEAST (registered trademark) SO", Tokai Carbon Co., Ltd. (FEF carbon black).
Tri-2-ethylhexyl trimellitate (plasticizer): "Adekacizer (registered trademark)C-8", ADEKA Co.
Polyether ester plasticizer 1: "Adekacizer RS-735", manufactured by Adeka Corporation.
Polyether ester-based plasticizer 2: "Adekacizer RS-700", manufactured by Adeka Corporation.
4,4'-di-(α,α-dimethylbenzyl) diphenylamine (antioxidant): "NOCRAC (registered trademark) CD", Ouchi Shinko chemical Co., Ltd.
Polyoxyethylene alkylether phosphoric acid esters (processing aid): "Phosphanol (registered trademark) RL210", manufactured by Toho chemical industry Co., Ltd.
ester-based wax (lubricant): "Greg G-8205", Dainippon ink chemical industry Co., Ltd.
hexamethylenediamine carbamate (polyamine-based cross-linking agent): "Diak #1", Dupont Dow Elastomers LLC.
1,8-diazabicyclo [5,4,0]undecene-7 (DBU) (crosslinking promotor): "Rhenogran (R) XLA-60", RheinChemie Co., DBU60%/

Example 1

Using the Banbury mixer, 50 parts of carbon black, 5 parts of tri-2-ethylhexyl trimellitate, 1.5 parts of 4,4'-di-(α,α-dimethylbenzyl)diphenylamine, 1 part of stearic acid, 1 part of polyoxyethylene alkylether phosphoric acid ester, 1 part of an ester-based wax, 1.51 parts of hexamethylenediamine carbamate, and 4 parts of 1,8-diazabicyclo[5,4,0]undecene-7(DBU) were added to 70 parts of nitride rubber (A1) prepared in Production Example 1 and 30 parts of acrylic rubber (B1) prepared in Production Example 5, and then the mixture was kneaded to prepare a crosslinkable rubber composition.

A crosslinked rubber was produced using the resulting crosslinkable rubber composition, and normal physical properties (tensile strength, breaking elongation, tear strength, and hardness), cold resistance, and finishing process manageability were tested and evaluated. The results are illustrated in Table 1.

Examples 2 to 9, Comparative Examples 1, 4, and 6

The crosslinkable rubber composition was prepared in the same manner as Example 1, except that the formulation indicated in Table 1 was changed, and the same tests and evaluations as in Example 1 were conducted. The results are illustrated in Table 1.

Examples 10 to 16 and Comparative Example 2

The crosslinkable rubber composition was prepared in the same manner as Example 1, except that the formulation indicated in Table 2 was changed, and the same tests and evaluations as in Example 1 were conducted. The results are illustrated in Table 2 (Comparative Examples 4 and 6 are repeatedly presented).

Examples 17 to 24, Comparative Examples 3, 5, and 7

The crosslinkable rubber composition was prepared in the same manner as Example 1, except that the formulation indicated in Table 3 was changed, and the same tests and evaluations as in Example 1 were conducted. The results are illustrated in Table 3.

Comparative Examples 8 and 9

The crosslinkable rubber composition was prepared in the same manner as Example 1, except that the formulation indicated in Table 4 was changed, and the same tests and evaluations as in Example 1 were conducted. The results are illustrated in Table 4 (Examples 2, 6, 11, and 14 are repeatedly presented for comparison).

TABLE 1

|  |  | E1 | E2 | E3 | E4 | E5 | E6 | E7 | E8 | E9 | CE1 | CE4 | CE6 |
|---|---|---|---|---|---|---|---|---|---|---|---|---|---|
| Composition of cross-linkable rubber composition | | | | | | | | | | | | | |
| Nitrile rubber (A1) | (parts) | 70 | 50 | 50 | 30 | 70 | 50 | 50 | 30 | 50 | 100 | — | — |
| Acrylic rubber (B1) | (parts) | 30 | 50 | 50 | 70 | — | — | — | — | — | — | 100 | — |
| Acrylic rubber (B3) Vamac Ultra IP | (parts) | — | — | — | — | 30 | 50 | 50 | 70 | — | — | — | 100 |
| Acrylic rubber (B5) ER A804 | (parts) | — | — | — | — | — | — | — | — | 50 | — | — | — |
| FEF carbon black | (parts) | 50 | 50 | — | 50 | 50 | 50 | — | 50 | 50 | 50 | 50 | 50 |
| Silica | (parts) | — | — | 60 | — | — | — | 60 | — | — | — | — | — |
| Tri-2-ethylhexyl trimellitate | (parts) | 5 | — | — | — | — | — | — | — | — | 5 | — | — |
| Polyetherester-based plasticizer 1 | (parts) | — | 5 | 5 | — | 5 | 5 | — | 5 | — | — | — | — |
| Polyetherester-based plasticizer 2 | (parts) | — | — | — | 5 | — | — | 5 | — | 5 | — | 5 | 5 |
| 4,4'-di-(α,α-dimethylbenzyl)diphenylamine | (parts) | 1.5 | 1.5 | 1.5 | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 | 1 | 1 | 1 |
| Polyoxyethylene alkylether phosphoric acid ester | (parts) | 1 | 1 | 1 | 1 | 1 | 1 | 1 | 1 | 1 | 1 | 1 | 1 |
| Ester-based wax | (parts) | 1 | 1 | 1 | 1 | 1 | 1 | 1 | 1 | 1 | 1 | 1 | 1 |
| Hexamethylenediamine carbamate | (parts) | 1.51 | 1.25 | 1.25 | 0.99 | 1.71 | 1.58 | 1.58 | 1.45 | 1.25 | 1.9 | 0.6 | 1.25 |
| 1,8-diazabicyclo[5,4,0]-undecene-7 (60% product) | (parts) | 4 | 4 | 4 | 4 | 4 | 4 | 4 | 4 | 4 | 4 | 4 | 4 |
| Normal physical properties | | | | | | | | | | | | | |
| Tensile strength | (MPa) | 16.3 | 14.2 | 14.1 | 11.3 | 18.6 | 19.2 | 19.0 | 19.3 | 16.4 | 18.6 | 9.97 | 19.6 |
| Breaking Elongation | (%) | 190 | 170 | 230 | 140 | 240 | 260 | 310 | 270 | 180 | 200 | 210 | 320 |
| Tear Strength | (N/mm) | 26.7 | 25.6 | 25.7 | 22.0 | 28.5 | 28.3 | 29.1 | 26.2 | 25.8 | 41.9 | 19.7 | 52.9 |
| Hardness (Duro A) | | 70 | 69 | 71 | 68 | 71 | 70 | 72 | 69 | 70 | 70 | 60 | 64 |
| Cold resistance | | | | | | | | | | | | | |
| TR10 | (° C.) | −32 | −32 | −32 | −32 | −32 | −32 | −32 | −32 | −33 | −32 | −28 | −28 |
| Finishing process product manageability | | | | | | | | | | | | | |
| Evaluation | | A | A | A | A | A | A | A | A | A | C | B | C |

TABLE 2

|  |  | E10 | E11 | E12 | E13 | E14 | E15 | E16 | CE2 | CE4 | CE6 |
|---|---|---|---|---|---|---|---|---|---|---|---|
| Composition of cross-linkable rubber composition | | | | | | | | | | | |
| Nitrile rubber (A2) | (parts) | 70 | 50 | 30 | 70 | 50 | 30 | 50 | 100 | — | — |
| Acrylic rubber (B1) | (parts) | 30 | 50 | 70 | — | — | — | — | — | 100 | — |
| Acrylic rubber (B3) Vamac Ultra IP | (parts) | — | — | — | 30 | 50 | 70 | — | — | — | 100 |
| Acrylic rubber (B5) ER A804 | (parts) | — | — | — | — | — | — | 50 | — | — | — |
| FEF carbon black | (parts) | 50 | 50 | 50 | 50 | 50 | 50 | 50 | 50 | 50 | 50 |
| Silica | (parts) | — | — | — | — | — | — | — | — | — | — |
| Tri-2-ethylhexyl trimellitate | (parts) | — | — | — | — | — | — | — | 5 | — | — |
| Polyetherester-based plasticizer 1 | (parts) | 5 | — | — | — | — | — | 5 | — | — | — |
| Polyetherester-based plasticizer 2 | (parts) | — | 5 | 5 | 5 | 5 | 5 | — | — | 5 | 5 |
| 4,4'-di-(α,α-dimethylbenzyl)diphenylamine | (parts) | 1.5 | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 | 1 |
| Polyoxyethylene alkylether phosphoric acid ester | (parts) | 1 | 1 | 1 | 1 | 1 | 1 | 1 | 1 | 1 | 1 |
| Ester-based wax | (parts) | 1 | 1 | 1 | 1 | 1 | 1 | 1 | 1 | 1 | 1 |
| Hexamethylenediamine carbamate | (parts) | 2.07 | 1.65 | 1.23 | 2.27 | 1.98 | 1.19 | 1.65 | 2.7 | 0.6 | 1.25 |
| 1,8-diazabicyclo[5,4,0]-undecene-7 (60% product) | (parts) | 4 | 4 | 4 | 4 | 4 | 4 | 4 | 4 | 4 | 4 |
| Normal physical properties | | | | | | | | | | | |
| Tensile strength | (MPa) | 16.3 | 14.5 | 12.7 | 19.1 | 19.3 | 19.4 | 16.8 | 19.0 | 9.97 | 19.6 |
| Breaking Elongation | (%) | 200 | 200 | 210 | 220 | 250 | 280 | 190 | 190 | 210 | 320 |

TABLE 2-continued

|  |  | E10 | E11 | E12 | E13 | E14 | E15 | E16 | CE2 | CE4 | CE6 |
|---|---|---|---|---|---|---|---|---|---|---|---|
| Tear Strength | (N/mm) | 26.5 | 25.6 | 24.4 | 28.9 | 29.4 | 29.6 | 25.7 | 36.5 | 19.7 | 52.9 |
| Hardness (Duro A) |  | 72 | 71 | 70 | 73 | 72 | 72 | 72 | 73 | 60 | 64 |
| Cold resistance |  |  |  |  |  |  |  |  |  |  |  |
| TR10 | (° C.) | −28 | −28 | −28 | −28 | −28 | −28 | −31 | −27 | −28 | −28 |
| Finishing process product manageability |  |  |  |  |  |  |  |  |  |  |  |
| Evaluation |  | A | A | A | A | A | A | A | B | B | C |

TABLE 3

|  |  | E17 | E18 | E19 | E20 | E21 | E22 | E23 | E24 | CE3 | CE5 | CE7 |
|---|---|---|---|---|---|---|---|---|---|---|---|---|
| Composition of cross-linkable rubber composition |  |  |  |  |  |  |  |  |  |  |  |  |
| Nitrile rubber (A3) | (parts) | 70 | 50 | 50 | 30 | 70 | 50 | 30 | 50 | 100 | — | — |
| Acrylic rubber (B2) | (parts) | 30 | 50 | 50 | 70 | — | — | — | — | — | 100 | — |
| Acrylic rubber (B4) Vamac Ultra LT | (parts) | — | — | — | — | 30 | 50 | 70 | — | — | — | 100 |
| Acrylic rubber (B5) ER A804 | (parts) | — | — | — | — | — | — | — | 50 | — | — | — |
| FEF carbon black | (parts) | 50 | 50 | — | 50 | 50 | 50 | 50 | 50 | 50 | 50 | 50 |
| Silica | (parts) | — | — | 60 | — | — | — | — | — | — | — | — |
| Tri-2-ethylhexyl trimellitate | (parts) | 5 | — | — | — | — | — | — | 5 | 5 | — | — |
| Polyetherester-based plasticizer 1 | (parts) | — | — | — | 5 | 5 | — | — | — | — | 5 | 5 |
| Polyetherester-based plasticizer 2 | (parts) | — | 5 | 5 | — | — | 5 | 5 | — | — | — | — |
| 4,4'-di-(α,α-dimethylbenzyl) diphenylamine | (parts) | 1.5 | 1.5 | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 | 1 | 1 |
| Polyoxyethylene alkylether phosphoric acid ester | (parts) | 1 | 1 | 1 | 1 | 1 | 1 | 1 | 1 | 1 | 1 | 1 |
| Ester-based wax | (parts) | 1 | 1 | 1 | 1 | 1 | 1 | 1 | 1 | 1 | 1 | 1 |
| Hexamethylenediamine carbamate | (parts) | 1.62 | 1.3 | 1.3 | 0.78 | 1.85 | 1.68 | 1.51 | 1.35 | 2.1 | 0.5 | 1.25 |
| 1,8-diazabicyclo[5,4,0]-undecene-7 (60% product) | (parts) | 4 | 4 | 4 | 4 | 4 | 4 | 4 | 4 | 4 | 4 | 4 |
| Normal physical properties |  |  |  |  |  |  |  |  |  |  |  |  |
| Tensile strength | (MPa) | 15.9 | 13.7 | 14.1 | 11.7 | 17.8 | 17.2 | 16.5 | 15.5 | 18.9 | 8.95 | 15.4 |
| Breaking Elongation | (%) | 180 | 190 | 220 | 190 | 210 | 220 | 230 | 170 | 190 | 190 | 240 |
| Tear Strength | (N/mm) | 21.9 | 20.4 | 22.1 | 20.3 | 25.8 | 27.7 | 29.6 | 22.5 | 31.2 | 15.1 | 32.3 |
| Hardness (Duro A) |  | 66 | 65 | 67 | 64 | 65 | 64 | 63 | 70 | 68 | 59 | 59 |
| Cold resistance |  |  |  |  |  |  |  |  |  |  |  |  |
| TR10 | (° C.) | −37 | −38 | −38 | −38 | −38 | −39 | −39 | −36 | −36 | −38 | −39 |
| Finishing process product manageability |  |  |  |  |  |  |  |  |  |  |  |  |
| Evaluation |  | A | A | A | A | A | A | A | A | B | B | B |

TABLE 4

|  |  | E2 | E6 | E11 | E14 | CE8 | CE9 |
|---|---|---|---|---|---|---|---|
| Composition of cross-linkable rubber composition |  |  |  |  |  |  |  |
| Nitrile rubber (A1) | (parts) | 50 | 50 | — | — | — | — |
| Nitrile rubber (A2) | (parts) | — | — | 50 | 50 | — | — |
| Nitrile rubber (A3) | (parts) | — | — | — | — | — | — |
| Nitrile rubber (A4) | (parts) | — | — | — | — | 50 | 50 |
| Acrylic rubber (B1) | (parts) | 50 | — | 50 | — | 50 | — |
| Acrylic rubber (B3) Vamac Ultra IP | (parts) | — | 50 | — | 50 | — | 50 |
| FEF carbon black | (parts) | 50 | 50 | 50 | 50 | 50 | 50 |
| Silica | (parts) | — | — | — | — | — | — |
| Tri-2-ethylhexyl trimellitate | (parts) | — | — | — | — | 5 | 5 |
| Polyetherester-based plasticizer 1 | (parts) | 5 | 5 | — | — | — | — |
| Polyetherester-based plasticizer 2 | (parts) | — | — | 5 | 5 | — | — |
| 4,4'-di-(α,α-dimethylbenzyl) diphenylamine | (parts) | 1.5 | 1.5 | 1.5 | 1.5 | 1.5 | 1.5 |
| Stearic acid | (parts) | 1 | 1 | 1 | 1 | 1 | 1 |
| Polyoxyethylene alkylether phosphoric acid ester | (parts) | 1 | 1 | 1 | 1 | 1 | 1 |

TABLE 4-continued

|  |  | E2 | E6 | E11 | E14 | CE8 | CE9 |
|---|---|---|---|---|---|---|---|
| Ester-based wax | (parts) | 1 | 1 | 1 | 1 | 1 | 1 |
| Hexamethylenediamine carbamate | (parts) | 1.25 | 1.58 | 1.65 | 1.98 | 1.5 | 1.83 |
| 1,8-diazabicyclo[5,4,0]-undecene-7 (60% product) | (parts) | 4 | 4 | 4 | 4 | 4 | 4 |
| Normal physical properties |  |  |  |  |  |  |  |
| Tensile strength | (MPa) | 14.2 | 19.2 | 14.5 | 19.3 | 14.6 | 18.7 |
| Breaking Elongation | (%) | 170 | 260 | 200 | 250 | 200 | 250 |
| Tear Strength | (N/mm) | 25.6 | 28.3 | 25.6 | 29.4 | 34.3 | 49.2 |
| Hardness (Duro A) |  | 69 | 70 | 71 | 72 | 72 | 73 |
| Cold resistance |  |  |  |  |  |  |  |
| TR10 | (° C.) | −32 | −32 | −28 | −28 | −25 | −25 |
| Finishing process product manageability |  |  |  |  |  |  |  |
| Evaluation |  | A | A | A | A | B | C |

As can be seen from Tables 1 to 4, in Examples 1 to 24 where the tear strength of the crosslinked rubber was found to be within the range of 20-30 N/mm, the finishing process manageability was evaluated as A. However, in Comparative Examples 1 to 9 where the tear strength was found to be outside the above range, the finishing process manageability was evaluated as B or C. The results indicated that the finishing process manageability was related to the tear strength of the crosslinked rubber.

Further, Tables 1 to 4 suggest that cold resistance and tear strength as hitherto inherent to each of the nitrile rubber (A) and the acrylic rubber (B) had relatively small effect on the crosslinked rubber, and the crosslinked rubber according to the present embodiment was obtained with excellent cold resistance and finishing process manageability.

For example, Table 1 suggests that in a case where each of the nitrile rubber (A1) and the acrylic rubber (B3) was used alone, the tear strength exceeded 30 N/mm, and the evaluation of the finishing process manageability was low (Comparative Examples 1 and 6); however, a combination of the nitrile rubber (A1) and the acrylic rubber (B3) was enabled to provide a crosslinked rubber with optimal tear strength (Examples 5 to 8). Furthermore, Table 1 suggests that cold resistance of the nitrile rubber (A1) will be maintained even in a case where the nitrile rubber (A1) is mixed with the acrylic rubber (B1) or an acrylic rubber (B3) (Examples 1 to 8), which when used alone, exhibited relatively low cold resistance (Comparative Examples 4 and 6).

In addition, Table 1 indicates that in a case where nitrile rubber (A1) to (A3) according to the present embodiment (Examples 2, 6, 11, 14, etc.) each containing α,β-ethylenically unsaturated monocarboxylic acid ester monomer units were used, excellent results were obtained with respect to both cold resistance and finishing process manageability. In contrast, in a case where nitrile rubber (A4) without containing α,β-ethylenically unsaturated monocarboxylic acid ester monomer units was used (Comparative Examples 8 and 9), cold resistance and finishing process manageability were both found to be insufficient (Table 4).

Although embodiments of the present invention have been described with reference to examples, the present invention is not limited to specific embodiments and examples, but various modifications and alterations may be made within the scope of the invention according to the appended claims.

The present international application is based on and claims priority to Japanese Patent Application No. 2017-067048, filed on Mar. 30, 2017, the entire contents of which are hereby incorporated by reference.

The invention claimed is:

1. A crosslinkable rubber composition comprising:
   a carboxyl group-containing nitrile rubber (A);
   a carboxyl group-containing acrylic rubber (B), the carboxyl group-containing acrylic rubber (B) containing 0.1 to 10% by weight of carboxyl group-containing monomer units; and
   a polyamine-based crosslinking agent (C),
   wherein a ratio of a weight of the carboxyl group-containing nitrile rubber (A) to a weight of the carboxyl group-containing acrylic rubber (B) is from 5:95 to 95:5,
   wherein the carboxyl group-containing nitrile rubber (A) includes
      5 to 60% by weight of α,β-ethylenically unsaturated nitrile monomer units, and
      α,β-ethylenically unsaturated monocarboxylic acid ester monomer units, and
   wherein the carboxyl group-containing nitrile rubber (A) has an iodine value of 120 or less.

2. The crosslinkable rubber composition according to claim 1, wherein a content of the α,β-ethylenically unsaturated monocarboxylic acid ester monomer units in the carboxyl group-containing nitrile rubber (A) is 5 to 60% by weight.

3. The crosslinkable rubber composition according to claim 1, wherein the α,β-ethylenically unsaturated monocarboxylic acid ester monomer units in the carboxyl group-containing nitrile rubber (A) are (meth)acrylic acid alkyl ester units.

4. The crosslinkable rubber composition according to claim 1, wherein the carboxyl group-containing nitrile rubber (A) includes α,β-ethylenically unsaturated dicarboxylic acid monoester monomer units, and the α,β-ethylenically unsaturated dicarboxylic acid monoester monomer units are maleic acid monoalkyl ester units.

5. The crosslinkable rubber composition according to claim 1, wherein a content of the polyamine-based crosslinking agent (C) with respect to a total amount of 100 parts by weight of the carboxyl group-containing nitrile rubber (A) and of the carboxyl group-containing acrylic rubber (B) is 0.1 to 20 parts by weight.

6. A crosslinked rubber produced by crosslinking the crosslinkable rubber composition according to claim 1.

7. The crosslinked rubber according to claim 6, wherein the crosslinked rubber is a seal.

\* \* \* \* \*